3,632,558
PRODUCTION OF SPINNABLE POLYAMIDES EXHIBITING A HIGH REGULARITY AND A HIGH DYEABILITY BY ACIDIC DYESTUFFS
Francesco Siclari, Cesano Maderno, Pierluigi Perazzoni, Palazzolo Milanese, and Piergiorgio Silvestroni, Cesano Maderno, Italy, assignors to Snia Viscosa Società Nazionale Industria Applicazioni Viscosa S.p.A., Milan, Italy
No Drawing. Filed July 23, 1968, Ser. No. 746,743
Claims priority, application Italy, Aug. 8, 1967, 19,335/67
Int. Cl. C08g 20/20
U.S. Cl. 260—78 R                    10 Claims

ABSTRACT OF THE DISCLOSURE

A method is disclosed for improving the dyeability of polyamide fibres by acidic dyes, said method comprising as an essential step the adoption of a nitrogenous compound, which can be broadly defined as belonging to the class of betaines or betaine-like compounds. Many examples are given, which show the criticality of the selection of the substituents in the general formula

R—NH—R′ or $(R_1, R_2, R_3)$—N—$R_4$—COO—, where the substituents indicated by the R's can be selected within a wide, but nevertheless strictly defined range.

---

This invention relates generally to the production of synthetic polyamide-based materials, more particularly polyamides to be used in the production of fibres, threads and yarns and having a high tinctorial uniformity along with a high degree of dyeability with acidic dyestuffs.

The importance of a good dyeability is already known with respect to the acidic dyeing materials, for textile materials such as, more particularly, fibres and yarns employed in the manufacture of fabrics intended for making articles of clothing and the like. Obviously, a high degree of affinity towards acidic dyestuffs should be desirably associated with features of tinctorial uniformity, without jeopardizing the other physico-chemical specifications of the textile material concerned.

With the term "polyamides" it is intended to connote, as the present disclosure proceeds, those polyamides which are generally known in the trade under the name of "nylon" accompanied by a numeral indicating their specific chemical nature, such as "nylon 66," "nylon 6," "nylon 11."

It is known in the appertaining art that the characteristics of dyeability of synthetic textile fibres, more particularly polyamides, is a function of the existence and the properties of end groupings of the polymeric chains. More particularly, the dyeability by acidic dyestuffs is a function of the existence and the number of end amino groupings of the polymer. The number of said end amino groupings is generally expressed in terms of equivalent amino groupings per $10^6$ grams of polymer. The magnitude of said number is a critical factor, which is an indication of the degree of affinity towards the dyestuffs. On the other hand, the achievement of a high number of end amino groupings is not sufficient, in itself, to ensure the obtention of satisfactory results, inasmuch as said achievement should not prejudice the desired value for the molecular weight: in addition, the end amino groupings should exhibit, as, and of themselves, favorable conditions of affinity towards the acidic dyestuffs.

It is known that several installations and methods have been suggested to improve the tinctorial performances of spinnable polyamides. For example, and more particularly in the production of "nylon 66," in order to introduce into the polyamide said amino end groupings, either an excess of the diamine used for the polymerization is employed, or the proportional amount of the chain-stabilizer used is appropriately adjusted, said chain-stabilizer being usually acetic acid. The latter technique is adopted, more specifically, in the production of "nylon 6," wherein the starting material employed is epsilon caprolactam. Acetic acid used as a chain-stabilizer also limits the number of the amino end groupings (—$NH_2$) in such a way that the polymer, and thus also threads and yarns obtained thereby, may possess the desired number of said groupings.

These conventional methods are, however, conducive to a few shortcomings and are subject to certain limitations. For example, if in the production of nylon 66, an excess of diamine beyond certain critical values, is adopted, detrimental phenomena of polymer decomposition may occur. Likewise, an amount of acetic acid other than the critical one in the production of nylon 6 does not permit the obtention of the desired degree of stabilization of the polymeric chains. In both cases, the desired degree of tinctorial evenness and regularity cannot be obtained in the production of threads and yarns, in spite of the fact that these may be suitable for the production of textile materials on account of other physico-chemical specifications.

It is also known that the adoption has been suggested of additives having basic groupings, more particularly, amino groupings, in the production of spinnable polyamides. Said additives are introduced in the monomer, or monomer mixture, or also in the mass, during progress of polymerization, so as to impart to the produced polyamides the desired number of dyeable amino groupings. Said additives can be used in association with a chain-stabilizer, such as acetic acid, to impart to the polymer the desired viscosity: as an alternative, said additives may possess, in themselves, the property of acting as chain-stabilizers.

In practice, as additives of the kind considered above, amines are employed which have either primary amino groupings, or primary aminic groupings in association with tertiary amino groupings. The use of said additives, however, cannot be regarded as a satisfactory solution of the characteristic technical problems of this invention. Compounds containing only primary amino groupings as used heretofore, undergo decomposition phenomena, especially when said additives are used in those considerably high amounts as are necessary for a high degree of dyeability to be attained. Amines which also possess a tertiary amino groupings did not afford, in turn, the most desirable results. According to a tentative interpretation of a few adverse features of said amines, it can be said that these features are the result of the fact that the tertiary nitrogen has no hydrogens available to originate hydrogen bonds with the carbonyl grouping of the adjoining polyamide chains.

In addition, a few conventional products or additives lead to the occurrence of cross-linking phenomena, which should be positively avoided in the production of polyamides for textile uses, wherein it is imperative, for the polymer, that it comprises only rigorously linear chains.

Another drawback of the conventional nitrogeneous additives is their inadequate compatibility with the monomer and, in general, with the starting materials used in polymerization (water and others), and, also, with the produced polyamides: more particularly a few additives exhibit a tendency towards being removed during progress of subsequent treatments, for example washing.

Another shortcoming of a few conventional additives is their excessive rate of evaporation under polymerization conditions.

With the foregoing considerations in mind, an object of this invention is an improvement of the above indicated production methods, such as to lead to the manufacture of synthetic textile products of a polyamidic nature, having a high degree of dyeability and a high tinctorial uniformity with acidic dyestuffs, without exhibiting, or, at least exhibiting in a much lesser degree, the above enumerated and other limitations and drawbacks of the conventional art.

More specifically, it is an object of this invention to identify and to use certain particular additives, which are adapted to perform both the functon of carriers of dyeable nitrogenous groupings and of stabilizers, said dyeable nitrogenous groupings exhibiting considerable and constant dyeability properties and being stably connected to their relevant polymeric chains without the additive giving rise to the occurrence of undesirable cross-linking phenomena or, in any case, of phenomena susceptible of prejudicing the linear nature of the chains, as specifically required in the field of the production of yarns and textile fibres in general.

It is also an object of the invention to identify and exploit nitrogenous additives which, in addition to the above mentioned property of imparting to the product the desirable characteristics of uniform and regular dyeability, exhibit a very high compatibility toward the starting materials and the produced polyamides, and which do not evaporate, or evaporate to a negligible extent only, under polymerization conditions.

The additives which have been identified as being characteristic for the invention consist of nitrogenous organic compounds selected from the group consisting of nitrogenous compounds having a primary or secondary nitrogen atom, or both, and in the class of betaines; provided that they possess at least nitrogen atoms and are endowed with high tinctorial properties in the presence and under the action of acidic dyestuffs, without, however, giving rise to cross-linking phenomena in polyamides, that is to say, that they have the above indicated critical and essential properties to the end of the production of textile fibres and yarns.

The selection among said nitrogenous compounds, which are characteristic for the invention, is predominantly a function of their availability and cheapness of production, of economical factors along with specific technical requirements. The nitrogenous compounds having a primary or secondary nitrogen atom (or both) which are endowed with the characteristic properties according to the invention are compounds having the general formula

R—NH—R′ wherein R stands for one of the following grouping:

an aryl radical
an alicyclic radical
a branched-chain alkyl
a mixed alkyl-aryl, or alkyl-alicyclic radical, and R′ stands for one of the following substituents:

hydrogen
methyl
a carboxyalkyl having from 2 to 11 carbon atoms
an aminoalkyl having from 2 to 11 carbon atoms, and which possibly has an acyl grouping attached to the nitrogen atom, said acyl having from 2 to 8 carbon atoms. In the latter case, also the secondary nitrogen atoms of the compound can be acylated with an acyl having from 2 to 8 carbon atoms.
an acyl containing from 2 to 8 carbon atoms, and in the above formula, when R′ is either hydrogen or methyl, R is a mixed alkyl-aryl, alkyl-alicyclic or branched-chain alkyl radical, directly bonded to the nitrogen atom by one or more methylene groupings.

Thus, to the ends of the invention, amines can be used in which the radical R is, for example, phenyl, a substituted phenyl, benzyl (among the aryl radicals or the mixed alkyl-aryl radicals), or, when R is an alicyclic radical, it can be a cyclopentyl, a cyclohexyl (also substituted) and lastly, among the branched-chain alkyl radicals, isopropyl, isobutyl, tripropylmethyl etc. The radical R′ can be, in addition to hydrogen and methyl, also a carboxyalkyl such as carboxyethyl, carboxypropyl, carboxypenthyl, carboxydecyl and other carboxyalkyls of the linear or branched series, or a mixed carboxyalkyl, such as an aliphatic-aryl carboxyalkyl. When R′ is an aminoalkyl, it can be amionethyl, aminopropyl, aminohexyl or it can be also a mixed aminoalkyl, containing for example aryl and aliphatic groupings, such aminooxylol. When R′ is an acyl, the nitrogenous compound will be an amide.

It has been ascertained by the applicant that the inventive nitrogenous compounds having the general formula given above possess a number of carbon atoms which is sufficient to impart to said compounds the property of not evaporating or of evaporating, at least, to a much lesser degree, from the reaction mass at the high temperatures required for polymerization. In addition, the nature of the grouping R, which is rather bulky, is such as to impart to the compounds involved a good compatibility with the starting materials and the produced polyamides as well.

Other amino compounds of a nature similar to that of the inventive compounds, by lying beyond the scope of the limitations imposed by the above formula, have proved not to possess the desirable essential characteristics for the invention. For example, several amino compounds have been tested as tinctorial additives in the preparation of polyamides: among these, laurylamine has shown poor compatibility characteristics toward the polymer, butylamine evaporated to a substantial degree during polymerization, butyl-propylamine did not impart to the produced polyamide a sufficient and regular dyeability and has shown a poor tendency toward being incorporated into the polyamide.

Within the scope of the amino compounds as identified by the invention, it has been found as a result of studies and experiments, that the structure of the radical R and the radical R′ has a decisive bearing on the behavior and the functions of the used amino additive, and also on the characteristics of the polyamide as produced with the employment of said additives.

For example, by employing an amine wherein the radical R is a mixed radical as described above, united to the nitrogen atom by a chain of methylene groupings, preferably a chain of from 1 to 3 methylenes, and the radical R′ is hydrogen or a methyl, the aminocompound exhibits a particularly satisfactory compatibility toward the produced polyamide.

A few examples of said compounds are: benzylamine, hexahydro-benzylamine and derivatives of said amines which are substituted in the ring, for example 4-methyl-hexahydrobenzylamine, or beta-tripropylethylamine, and also N-methyl-benzylamine, N-methyl-hexahydrobenzylamine and N-methyl-beta-tripropylethylamine.

Amides can be used with advantages, more particularly acetylamides, derived from the cited primary amines, for example benzylacetamide, 4 - methyl - benzylacetamide, hexahydrobenzylpropionamide, 1-phenyl - N - acetyl-3-aminopropane,

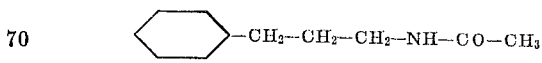

2-methyl-N-pentanoyl-3-aminopropane

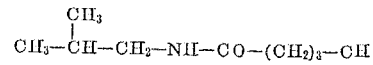

The above cited primary and secondary amines can be used with advantage also if they are salified with either organic or inorganic acids, such as acetic, hydrochloric acid and others.

Results of very high substantial compatibility are correspondingly obtained by using nitrogeneous compounds in which R' consists of a carbon atoms chain terminated by a carboxyl and comprising from 2 to 11 carbon atoms, consistently with the above given definition. A particularly interesting case of such a class of nitrogenous compounds is given by the use of N-isopropyl-epsilon-aminocaproic acid, for whose preparation epsilon-caprolactam can readily be resorted to, said caprolactam being the starting monomer for the production of the nylon 6 polyamide in the current practice of the art. Other favorable compounds, encompassed within the class considered here, are N-benzyl-epsilon-aminocaproic acid, N-cyclohexyl-epsilon-aminocaproic acid and N - tolyl-epsilon-aminocaproic acid.

Other favorable compounds are, for example, N-benzyl-gamma-amino-butyric acid, N - cyclohexyl - gamma-aminobutyric acid, N-isobutyl-gamma aminobutyric acid: among the compounds which can be obtained by using as one of the starting material omega-amino-undecanoic acid, a monomer used in the production of the so-called nylon 11, N - cyclohexyl-omega-amino-undecanoic acid can be cited. Among the compounds in which the radical R' consists of an aminoalkyl, that is a chain of from 2 to 11 carbon atoms, and terminated by a primary amino grouping, the following can be enumerated:

1-hexahydroxylenamino-3-propane

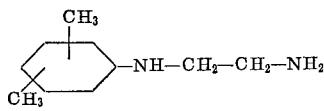

1-cyclohexylamino-3-aminopropane, 1 - benzylamino - 3-aminopropane, 1-isopropylamino-4-aminobutane, 1-benzylamino-6-aminohexane, and N-isopropyl-meta-xylylenediamine.

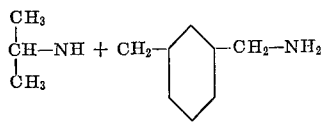

These compounds are thus diamines which contain both a primary and a secondary amino groupings. It has been ascertained that they permit to prepare a polymer having a particularly high dyeability. By using these secondary-primary amino compounds it has proven to be experimentally practicable to produce polyamides having up to 50–100 dyeable amino groupings, expressed in terms of equivalent groupings per $10^6$ gms. of polymer, that is, values which correspond to a particularly high degree of dyeability of polyamides and yarns obtained thereby.

Also these above listed amino compounds can be used as such, or also salified with either organic or inorganic acids such as acetic, hydrochloric acid and others: also the amides derived from said primary-secondary diamines can be used with advantage.

The nitrogenous compounds which are characteristic for the invention, but belong to the betaine class, are defined by the following general formula:

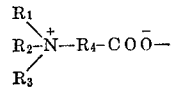

and respond to the conditions that $R_4$ s a carbon chain, provided it contains from 1 to 10 carbon atoms and that $R_1$, $R_2$ and $R_3$ are alkyls, aryls or an alicyclic radical, either substituted or unsubstituted.

For example, among the betaines in which said radical $R_1$, $R_2$ and $R_3$ are an aryl or an alkyl, the following can be listed. phenyldimethylbetaine, phenyldipropylbetaine, triethylbetaine, N - trimethyl-gamma-aminobutyric acid. An example of a betaine wherein $R_1$, $R_2$ and $R_3$ are alicyclic and alkyl radicals is cyclohexyldipropylbetaine.

Particularly advantageous results are obtained with the use of betaines, corresponding to the above indicated conditions, and in which said radicals $R_1$, $R_2$ and $R_3$ are alkyls and more particularly alkyls having from 2 to 8 carbon atoms, and $R_4$ is a saturated linear chain, such as N-triethyl-beta-aminopropionic acid, N-tripropyl-epsilon-aminocaproic acid and N-triethyl - omega - aminoundecanoic acid. Among these betaines, those in which $R_4$ contains a carbon atom have proven to be advantageous and easy to prepare, such as triethylbetaine, and tripropylbetaine.

Also the betaines corresponding to the definitions given above can be used either as such or salified.

The inventive additives should be used in a proportion between 0.05 and 2, and preferably between 0.2 and 0.6 mole per 100 moles of the used monomer.

They are used with possible other additives, such as delustering agents, by adding them to the monomers or monomer solutions at the outset of the polymerization operations which are carried out to produce the polyamides. They can also be added during progress of polymerization, provided that the relative viscosity of the reaction mass has not exceeded the value of 2.3.

Their use does not involve any particular modification in the usual polymerization process run. The invention will be further illustrated with the aid of the following practical examples which should not be construed as limitations in the operative details of the invention.

EXAMPLES

The following Examples 1, 2 and 3 have been obtained with the following procedure: 100 grams of caprolactam and 3 mls. of water along with 3 grams of epsilon-aminocaproic acid (catalyst) and the stabilizer to be examined are charged into large glass test tubes for polymerization. The test tubes are then placed to polymerize in groups of four or eight at a time in a single heating block having the cavities filled with silicone oil and such as not to induce temperature variations wider than 0.25° C. at 265° C.

On completion of polymerization under atmospherical pressures, the polymers are placed in a vacuo, as indicated from time to time, for three hours.

Upon cooling, the polymers are washed, dried and subjected to titration of the amino groupings with N/20 HCl solutions. The operation is carried out in such a way that the titration error is wholly negligible.

EXAMPLE 1

Comparison between methyl-benzylamine acetate and acetic acid

Acetic acid is 0.16 gram per 100 grams of caprolactam. Methyl-benzylamine acetate is 0.300 gram per 100 grams caprolactam, that which corresponds to 0.19 mole per 100 moles of caprolactam. The operative conditions are as described above.

All the examples show a considerable and unpredictable superiority of methylbenzylamine acetate, both as regards the number and the regularity of the nitrogenous dyeable groupings as compared with acetic acid.

This fact is still more remarkable in that other acetates of experimental amines did not show any superior quality as compared with acetic acid as regards the uniformity of the amino groupings. For example, methyl-cyclohexylamine acetate and laurylamine acetate were not better than acetic acid.

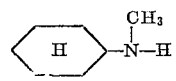

| Polymerization temperature and residual pressure | Methylbenzylamine acetate | | Acetic acid | | $\dfrac{\Sigma \Delta \text{ methylbenzylamine acetate}}{\Sigma \Delta \text{ acetic acid}}$ |
|---|---|---|---|---|---|
| | Equiv. amino groups per $10^6$ grs. of polymer | Deviation from average ($\Delta$) | Equiv. amino groups per $10^6$ grs. of polymer | Deviation from average ($\Delta$) | |
| (1) 260° C., 250 mm. Hg | 35.3 | −0.5 | 30.4 | +2.0 | |
| | 36.8 | +1.0 | 28.7 | +0.3 | |
| | 35.8 | 0 | 28.2 | −0.2 | $\dfrac{2.0}{4.6}=0.44$ |
| | 35.3 | −0.5 | 26.3 | −2.1 | |
| Average | 35.8 | | 28.4 | | |
| Total | | Σ 2.0 | | Σ 4.6 | |
| (2) 260° C., 250 mm. Hg | 37.3 | +0.05 | 30.4 | +0.4 | |
| | 37.3 | +0.05 | 27.7 | −2.3 | |
| | 37.1 | −0.15 | 29.6 | −0.4 | $\dfrac{0.30}{5.6}=0.05$ |
| | 37.3 | +0.05 | 32.5 | +2.5 | |
| Average | 37.25 | | 30.0 | | |
| Total | | Σ 0.30 | | Σ 5.6 | |
| (3) 260° C., 340 mm. Hg | 45.1 | −0.35 | 52.0 | +8.3 | $\dfrac{0.7}{16.6}=0.04$ |
| | 45.8 | +0.35 | 35.4 | −8.3 | |
| Average | 45.45 | | 43.7 | | |
| Total | | Σ 0.7 | | Σ 16.6 | |
| (4) 260° C., 200 mm. Hg | 36.1 | +0.15 | 30.4 | +2.8 | $\dfrac{0.30}{5.6}=0.05$ |
| | 35.8 | −0.15 | 24.8 | −2.8 | |
| Average | 35.95 | | 27.6 | | |
| Total | | Σ 0.30 | | Σ 5.6 | |
| (5) 260° C., 180 mm. Hg | 34.1 | −0.25 | 30.4 | +1.3 | $\dfrac{0.50}{2.6}=0.19$ |
| | 34.6 | +0.25 | 27.8 | −1.3 | |
| Average | 34.35 | | 29.1 | | |
| Total | | Σ 0.50 | | Σ 2.6 | |
| (6) 260° C., 230 mm. Hg | 35.8 | −0.7 | 28.8 | −2.3 | $\dfrac{1.4}{4.6}=0.30$ |
| | 34.4 | +0.7 | 33.4 | +2.3 | |
| Average | 35.1 | | 31.3 | | |
| Total | | Σ 1.4 | | Σ 4.6 | |

Consequently, the improved behaviour is not a general rule, but is specific for the family of compounds having the general formula reported above. From the polymers obtained according to this example, yarns of 20/5 deniers have been extruded by spinning with a drawing ratio of 1:3.6; from these textile tapes have been obtained, to be used for the dyeability tests.

The tapes have been immersed in a dyeing bath at 100° C. containing Alizarine blue in an amount which was calculated in excess with respect to the one which would be normally absorbed by the fibre, that is, the bath contained 10% of dyeing liquor with respect to the weight of the fibre. The tapes have been kept for two hours in said bath and have been compared with each other on completion of the conventional washing and drying operations.

The tapes prepared from polyamides produced with the adoption of methylbenzylamine acetate have shown a more uniform and more regular color, as compared with those obtained with a polyamide produced with acetic acid only.

EXAMPLE 2

Comparison of the stability of the amino groups in polyamide stabilized with methylbenzylamine acetate vs. polyamides produced with acetic acid, when subjected to equal variations of the residual pressure.

Eight large test tubes are placed in a block: of these, four are stabilized with 0.15 gr. of acetic acid and four with 0.300 gr. of methylbenzylamine acetate. Polymerization is carried out down to a certain residual degree of vacuum, for example 410 mm. Hg. Two test tubes with acetic acid are removed, along with two test tubes with methylbenzylamine acetate. Then polymerization is continued, under a higher vacuum, for example 200 mm. Hg of residual pressure, on the two remaining test tubes. The group difference caused by the vacuum are separately evaluated.

| Polymerization temperature (260° C.) and residual pressure | Methylbenzylamine acetate | | Acetic acid | | $\dfrac{\Delta \text{ methylbenzylamine acetate}}{\Delta \text{ acetic acid}}$ |
|---|---|---|---|---|---|
| | Equiv. amino groups per $10^6$ grs. of polymer | Difference of the two average values ($\Delta$) | Equiv. amino groups per $11^6$ grs. of polymer | Difference of the two average values ($\Delta$) | |
| (1a) 410 mm. Hg | 43.8 | | 35.3 | | $\dfrac{9.35}{16.25}=0.58$ |
| | 46.8 | | 52.4 | | |
| Average | 45.30 | 9.35 | 43.85 | 16.25 | |
| (1b) 200 mm. Hg | 36.1 | | 30.4 | | |
| | 35.8 | | 24.8 | | |
| Average | 35.95 | | 27.60 | | |
| (2a) 430 mm. Hg | 53.4 | | 44.4 | | $\dfrac{14.55}{18.05}=0.80$ |
| | 44.4 | | 49.9 | | |
| Average | 48.90 | 14.55 | 47.15 | 18.05 | |
| (2b) 180 mm. Hg | 34.1 | | 30.4 | | |
| | 34.6 | | 27.8 | | |
| Average | 34.35 | | 29.10 | | |

Methylbenzylamine acetate shows absolute differences due to different production operations, which are equal to 0.6–0.8 of the differences encountered in polymer with acetic acid. Said differences become 0.5–0.6 if, considered in percentage on the amino groupings present. Thus, the polyamide flake stabilized with methylbenzylamine is also more resistant to differences due to occasional incorrect production operations.

EXAMPLE 3

Comparison of the stability of amino groupings in polyamides stabilized with methylbenzylamine acetate vs. triethylbetaine Tests are carried out with the above described methods by employing 0.240 gr. methylbenzylamine acetate or 0.424 gr. triethylbetaine per 100 grs. caprolactam (these correspond to 0.15 mole of methylbenzylamine acetate, and 0.33 mole of triethylbetaine per 100 moles of caprolactam).

| Polymerization temperature and residual pressure | Methylbenzylamine acetate | | Triethylbetaine | |
|---|---|---|---|---|
|  | Equiv. amino groupings per $10^6$ grs. of polymer | Difference of the two averages ($\Delta$) | Equiv. amino groupings per $10^6$ grs. of polymer | Difference of the two averages ($\Delta$) |
| (1) 260° C., 250 mm. Hg. | 36.6 | −0.2 | 39.2 | +0.35 |
|  | 37.0 | +0.2 | 38.5 | −0.35 |
| Average | 36.8 | Σ0.4 | 38.85 | Σ0.7 |
| (2) 260° C., 250 mm. Hg. | 40.6 | +2.75 | 40.4 | +2.58 |
|  | 36.3 | −1.55 | 36.1 | −1.72 |
|  | 37.0 | −0.85 | 37.3 | −0.52 |
|  | 37.5 | −0.36 | 37.5 | −0.32 |
| Average | 37.85 | Σ5.50 | 37.82 | Σ5.14 |
| (3) 260° C., 340 mm. Hg. | 45.4 | −0.65 | 46.2 | −0.1 |
|  | 46.7 | −0.65 | 46.4 | +0.1 |
| Average | 46.05 | Σ1.3 | 46.3 | Σ0.2 |

As can be seen, triethylbetaine has a behaviour as a stabilizer which is very akin to that of methylbenzylamine acetate.

Betaines, however, must be complaint with the prerequisites indicated in the present specification. Thus, for example, trimethylbetaine is not a good stabilizer in that it contains only 5 carbon atoms and not the minimum number of 7 required by the present invention.

EXAMPLE 4

The stabilizers which have been used are:

Test (a):
  Benzylamine
  4-methylcyclohexylamine
Test (b):
  Benzylamine acetate
  Laurylamine acetate In an aluminum block are polymerized 100 grs. of caprolactam with 5 grs. water and 3 grs. epsilon-aminocaproic acid and the stabilizer concerned. The temperature is 265° C. and the final pressure of polymerization is 300 mm. Hg. (residual).

In the test (a) a large test tube is charged with 0.321 gr. benzylamine and another large test tube is charged with 0.340 gr. 4-methylcyclohexylamine. In both tests, 0.34 mol of stabilizer per 100 mols of caprolactam are used.

The polymer is flaked and then washed and dried, and gives the following results.

TEST (a)

| Stabilizer | Equivalent amino groups per $10^6$ grs. of polymer | Relative viscosity in $H_2SO_4$ [a] | Percentage by weight of stabilizer [b] |
|---|---|---|---|
| Benzylamine | 48 | 2.60 | 10.5 |
| 4-methylcyclohexylamine | 40 | 2.75 | 31 |

[a] The relative viscosity data in sulphuric acid of this example and of the following are determined on a solution containing 1 gr. of polymer in 100 mls. of solution, at a temperature of 20° C. The concentration of sulphuric acid is 96.5% ± 0.2%.
[b] Titrated in venting outs after polymer with respect to the initially used amounts.

Test (b) employs in four large test tubes 0.251 gr. of benzylamine acetate (0.17 mole per 100 moles of caprolactam) and in four additional test tubes 0.367 gr. of laurylamine acetate (0.17 mole per 100 moles of caprolactam). The analysis of the polymer has given the following results:

TEST (b)

| Stabilizer | Equivalent amino groups per $10^6$ grs. of polymer | Viscosity in sulphuric acid |
|---|---|---|
| Benzylamine acetate | 40.6 | 2.68 |
|  | 40.0 | 2.65 |
|  | 39.5 | 2.71 |
|  | 40.2 | 2.67 |
| Laurylamine acetate | 41.5 | 2.61 |
|  | 39.5 | 2.70 |
|  | 38.7 | 2.81 |
|  | 39.2 | 2.72 |

Benzylamine acetate exhibits a good tinctorial regularity, whereas laurylamine acetate gives worse results, probably because the amino groups are not present with the required regularity. A test similar to test (b) has been performed by using hexahydrobenzylamine acetate instead of benzylamine acetate, confirming the results obtained in test (b).

EXAMPLE 5

Stabilizers used:

Benzylamine acetylamide
Benzylamine acetate

In a block of aluminum with four holes, 4 large glass test tubes are introduced, each test tube being charged with 100 grs. of caprolactam, 5 grs. water and 3 grs. epsilon-aminocaproic acid.

In two test tubes there have been introduced, as stabilizers, 0.22 gr. of benzylamine acetylamide, whereas the other two test tubes have 0.25 gr. each of benzylamine acetate as a stabilizer. In all of the tests, the stabilizer is in a proportion of 0.17 mole per 100 moles of caprolactam. Polymerization is carried out at 265° C. initially for four hours at ambient pressures in an atmosphere of nitrogen, then for 3 hours at a pressure lower than the ambient pressure and ending with a residual pressure of 250 mm. Hg. The polymer is cooled, flaked and washed for 12 hours with boiling water.

The examination of the polymer has given the following results:

| Stabilizer | Equivalent amino groups per $10^6$ grs. of polymer | Relative viscosity in $H_2SO_4$ | Weight percent of stabilizer [a] |
|---|---|---|---|
| Benzylacetamide | 39 | 2.72 | 5.4 |
|  | 42 | 2.70 | 4.9 |
| Benzylamine acetate | 39.5 | 2.75 | 12.2 |
|  | 38.5 | 2.71 | 11.4 |

[a] Titrated in venting outs after polymerization with respect to the initially used amounts.

These tests are examples of the diminished volatility of the same amine when employed as an amide instead of as a salt.

EXAMPLE 6

N-benzyl-gamma-aminobutyric acid
N-isopropyl-epsilon-aminocaproic acid
N-benzyl-omega-aminoundecanoic acid An autoclave is charged with 10 kgs. caprolactam, 70 grs. titan dioxide, 500 grs. water and the stabilizer. Polymerization is carried out with the procedure of Example 5.

As stabilizers there have been employed in a test 48 grs. of N-benzyl-gamma-aminobutyric acid, in another test 43 grs. of N-isopropyl-epsilon-aminocaproic acid, and in the third test 73 grs. of N-benzyl-omega-aminoundecanoic acid, all of them corresponding to 0.29 mole per 100 moles of caprolactam.

Upon extrusion and washing, the flake has given the following results:

| Stabilizer (acid) | Equivalent amino groups per $10^6$ grs. of polymer | Relative viscosity in sulphuric acid |
|---|---|---|
| N-benzyl-gamma-aminobutyric | 40.5 | 2.80 |
| N-isopropyl-epsilon-aminocaproic | 42.0 | 2.70 |
| N-benzyl-omega-aminoundecanoic | 41.6 | 2.85 |

The flakes have been spun by extrusion and drawn in five filament threads, totalling 20 deniers. The fibres do not show any spinning defect and show a good dyeability and regularity of dyeing with acidic dyes, i.e. alizarine blue, the dyeing operation being carried out as in Example 1. In addition, the stabilizers exhibit a very low volatility during polymerization and have a good compatibility towards the polymer.

EXAMPLE 7

The stabilizers used were:

1-benzylamino-3-aminopropane monoacetate
1-(N,N-cyclohexylmethyl)-amino-3-aminopropane monoacetate An autoclave is charged with 28 kgs. caprolactam, 0.200 kg. titanium dioxide and 1 kg. water.

As stabilizer there are employed: in a test 89 grs. of 1-(N,N-cyclohexylmethyl)-amino-3-aminopropane-monoacetate, in the other test 86 grs. of 1-benzylamino-3-aminopropane monoacetate.

Both stabilizers are thus used in a proportion of 0.17 mole per 100 moles of caprolactam.

Polymerization is carried out at 265° C. while heating during three hours under a pressure of 3 atmospheres. The gas is then vented out to ambient pressure and finally a vacuum is applied during three hours until attaining at the end of the operation a residual pressure of 300 mm. Hg.

The extruded polymer is then flaked and washed during 24 hours in boiling water.

The examination of the polymer has given the following results.

| Stabilizer (monoacetate) | Equivalent amino groups per $10^6$ grs. of polymer | Relative viscosity in sulphuric acid | Percent by weight of stabilizer [a] |
|---|---|---|---|
| 1-(N,N-cyclohexyl-methyl) amino 3-aminopropane | 45 | 2.80 | 10.5 |
| Benzylamino-3-aminopropane | 50 | 2.70 | 5.9 |

[a] Titrated in polymerization venting outs with respect to initially used amounts.

These tests are examples of the lesser volatility of primary-secondary diamines with respect to primary-tertiary diamines having nearly the same molecular weight, since the secondary amino group has a better affinity towards the polymer mass as compared with that of the tertiary amino group.

EXAMPLE 8

1-benzylamino-3-aminopropane
1-hexahydroxylenamino-3-aminopropane
1-(N,N-cyclohexylmethyl)-amino-3-aminopropane hexamethylenediamine An autoclave is charged with 100 kgs. caprolactam, 5 kgs. water and 1 kg. titanium dioxide, the mass being polymerized as set forth in Example 5.

As stabilizers, there were used in a first test 492 grs. of 1-benzylamino-3-aminopropane, in another test 552 grs. of 1-hexahydroxylenamino-3-aminopropane, in a further test 510 grs. 1-(N,N-cyclohexylmethyl)amino-3-aminopropane and in the fourth test 342 grs. of hexamethylenediamine. All the stabilizers are present in a proportion of 0.37 mole per 100 moles of caprolactam. The polymer has been extruded, flaked, washed with water and dried.

The examination of the polymer has given the following results:

| Stabilizer (monoacetate) | Equivalent amino groups per $10^6$ grs. of polymer | Relative viscosity in sulphuric acid | Percent by weight of stabilizer [a] |
|---|---|---|---|
| 1-benzylamino-3-aminopropane | 79 | 2.61 | 6.1 |
| 1-hexahydroxylenamino-3-aminopropane | 76 | 2.52 | 6.8 |
| 1-(N,N-cyclohexylmethyl)-amino-3-aminopropane | 78 | 2.60 | 17.2 |
| Hexamethylenediamine | 75 | 2.58 | 1.5 |

[a] Titrated in polymerization venting outs with respect to initially used amounts.

The flakes have then been spun by extrusion through an extruder so as to obtain 5-filament threads. Said drawn threads (drawing ratio 1:3.6) have an overall denier of 20. Pieces of fabrics made with said yarns have been dyed with baths containing the acidic dye Alizarine blue with the same procedure of Example 1.

Dyeability was intense for all the kinds of yarns. However, the first two stabilizers, primary-secondary diamines, proved to be better. Differently from the primary-tertiary amine, they are less volatile and the polymer prepared thereby has less defects in spinning than the one prepared with hexamethylenediamine.

EXAMPLE 9

The stabilizers used were:

N-isopropyl-metaxylylenediamine
1-isobutylamino-6-aminohexane
1-isopropylamino-omega-aminoundecane In an autoclave are polymerized 10 kgs. of hexamethylene diamine adipate with 50 grs. titanium dioxide, 0.5 kg. of water and the stabilizer according to the procedure of Example 4.

In a test the stabilizer used is 53 grs. of N-isopropylmethylenediamine, in another test 51 grs. of 1-N-isobutylamino-6-amino-hexane, and in the third test 68 grs. of 1-N-isopropylamino-11-amino-undecane. All the stabilizers are present in a proportion of 0.79 mole per 100 moles of monomer. The extruded polymer is flaked and has been examined, the following results being obtained.

| Stabilizer (monoacetate) | Equivalent amino groups per $10^6$ grs. of polymer | Relative viscosity in sulphuric acid | Percent by weight of stabilizer [a] |
|---|---|---|---|
| N-isopropylmethoxylene diamine | 81 | 1.05 | 6.1 |
| 1-isobutylamino-6-amino-hexane | 78 | 1.07 | 6.9 |
| 1-isopropylamino-omega-aminoundecane | 79 | 1.04 | 2.5 |

[a] Titrated in polymerization venting outs with respect to initially used amounts.

Fibres of 20 denier, 5 filament, obtained with said three polymers, show a great affinity towards acidic dyestuffs on account of the high content of aminic groups and have also a good regularity during spinning.

EXAMPLE 10

1-(N-N, isobutyl-acetyl) amino-3-N'-acetylaminopropane

In an autoclave are polymerized 10 kgs. caprolactam according to the procedure of Example 5, using as the chain stabilizer 22 grs. of 1-(N,N-isobutyl-acetyl)-amino-3 N'-acetylaminopropane (0.113 mole per 100 moles caprolactam).

A polymer is obtained, having 34 equivalent amino groups and a relative viscosity in sulphuric acid of 2.65. Said polymer has been spun and has shown a great regularity during spinning and a good affinity towards acidic dyes.

EXAMPLE 11 triethylbetaine
N-trimethyl-gamma-aminobutyric acid
N-triethyl-epsilon-aminocaproic acid 10 kgs. caprolactam and 100 grs. titanium dioxide, along with 0.5 kg. water are polymerized according to the method of Example 4 using as the stabilizer, in one test 47 grs. of triethylbetaine, in a second test 43 grs. of N-trimethyl-gamma-aminobutyric acid, and in another test 64 grs. of N - triethyl-epsilon-aminocaproic acid. Said stabilizers are then used in a proportion of 0.33 mole per 100 moles of caprolactam.

The polymer is extruded, washed and examined, the results being the following:

| Stabilizer | Equivalent amino groups per 10⁶ grs. of polymer | Relative viscosity in sulphuric acid |
|---|---|---|
| Triethylbetaine | 37.5 | 2.67 |
| N-trimethyl-gamma-amino-butyric acid | 35.5 | 2.70 |
| N-triethyl-epsilon-amino-caproic acid | 38.2 | 2.68 |

These three polymers have shown, on extrusion, a very good regularity and affinity towards acidic dyes.

What is claimed is:

1. The method of producing spinnable saturated aliphatic polycarbonamides having a high regularity and tinctorial affinity toward acidic dyes comprising polymerizing the polycarbonamide forming reactants thereof, in the presence of an organic nitrogenous compound having at least seven carbon atoms and selected from the group consisting of a betaine having the general formula:

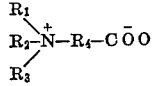

where $R_1$, $R_2$ and $R_3$ are alkyls or aryls, or alicyclic radicals, and $R_4$ is a carbon chain having 1 to 10 carbon atoms, and of a compound having a primary or a secondary nitrogen atom and having the general formula:

$$R—NH—R'$$

where R is selected from the group consisting of an aryl radical, an alicyclic radical, a branched alkyl, a mixed alkyl aryl radical, and an alkyl-alicyclic mixed radical, and R' is selected from the group consisting of hydrogen, methyl, a carboxyalkyl having 2 to 11 carbon atoms, an aminoalkyl having 2 to 11 atoms and capable of being acylated on the nitrogen atom with a hydrocarbonoyl radical containing from 2 to 8 carbon atoms, and when R' is a hydrogen or a methyl, R is selected from the group consisting of a mixed alkyl aryl or alkyl-alicyclic radical, or a branched alkyl, directly bonded to the nitrogen atom by one or more methylene groups.

2. The method of producing spinnable saturated aliphatic polycarbonamides according to claim 1, wherein in the formula for the nitrogenous compound R' is hydrogen and this compound is selected from the group consisting of benzylamine, hexahydrobenzylamine, 4-methyl-hexahydrobenzylamine, and beta-tripropylethylamine.

3. The method of producing spinnable saturated aliphatic polycarbonamides according to claim 1, wherein in the formula for the nitrogenous compound R' is a methyl radical and the nitrogenous compound is selected from the group consisting of N-methylbenzylamine, N-methyl-hexahydrobenzylamine, and N-methylbeta-tripropylethylamine.

4. The method of producing spinnable saturated aliphatic polycarbonamides according to claim 1 wherein the nitrogenous compound has the formula recited and R' is a carboxyalkyl and this compound is selected from the group consisting of N-isopropyl-epsilon-aminocaproic acid, N-benzyl-epsilon-aminocaproic acid, N-cyclohexyl-epsilon-aminocaproic acid, N-tolyl-epsilon-aminocaproic acid, N-cyclohexyl-gamma-aminobutyric acid, N-isobutyl-gamma-aminobutyric acid, and N-cyclohexyl-omega-amino-undecanoic acid.

5. The method of producing spinnable saturated aliphatic polycarbonamides according to claim 1, wherein the nitrogenous compound has the formula recited where R' is an aminoalkyl and is selected from the group consisting of 1-benzylamino-3-aminopropane, 1-hexahydroxylylamino-3-aminopropane, 1-cyclohexylamino-3-aminopropane, 1 - isopropyl-4-aminobutane, 1-benzylamino-6-aminohexane, and N-isopropylmetaxylylenediamine.

6. The method of producing spinnable saturated aliphatic polycarbonamides, having between 30 and 85 amino groups for 10⁶ grams of polymer, and having a high regularity and tinctorial affinity towards acidic dyes, comprising polymerizing the polycarbonamide forming reactants thereof, in the presence of an organic nitrogenous compound having at least seven carbon atoms, said compound being selected from the group consisting of nitrogenous compounds having the general formula:

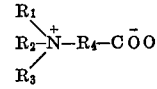

wherein $R_1$, $R_2$ and $R_3$ are alkyls or aryls, or alicyclic radicals, and $R_4$ is a carbon chain comprising from 1 to 10 carbon atoms.

7. The method of producing spinnable saturated aliphatic polycarbonamides according to claim 6, wherein said nitrogenous compound is selected from the group consisting of triethylbetaine and tripropylbetaine.

8. The method of producing spinnable saturated aliphatic polycarbonamides according to claim 6, wherein $R_1$, $R_2$ and $R_3$ are alkyls having 2 to 8 carbon atoms and $R_4$ is a saturated linear chain, and the nitrogenous compound is selected from the group consisting of N-triethyl-beta-aminopropionic acid, N-tripropyl-epsilon-aminocaproic acid, and N-triethyl-omega-aminoundecanoic acid.

9. The method of producing spinnable saturated aliphatic polycarbonamides having a high regularity and tinctorial affinity toward acidic dyes comprising polymerizing the polycarbonamide forming reactants thereof, in the presence of an organic nitrogenous compound selected from the group consisting of a betaine having the general formula

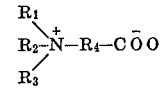

where $R_1$, $R_2$ and $R_3$ are alkyls or aryls or alicyclic radicals and $R_4$ is a carbon chain comprising 1 to 10 carbon atoms, and of a compound having the general formula $$R—NH—R'$$

where R is one of the group consisting of an aryl radical, an alicyclic radical, a branched alkyl, a mixed alkyl-aryl radical and an alkyl-alicyclic mixed radical, and R' is a hydrocarbonoyl radical containing from 2 to 8 carbon atoms and said nitrogenous compound is employed in an amount between 0.05 and 2 moles per 100 moles of the monomer used.

10. The method of producing spinnable saturated aliphatic polycarbonamides, having between 30 and 85 amino groups for $10^6$ grams of polymer and having a high regularity and tinctorial affinity towards acidic dyes, comprising polymerizing the polycarbonamide forming reactants thereof in the present of and in the proportion of between 0.05 and 2 moles of additive per 100 moles of monomer, an organic nitrogenous compound comprising at least seven carbon atoms, and selected from the group consisting of nitrogenous compounds having a primary or a secondary nitrogen atom, or both, and the general formula

R—NH—R' where R is selected from the group consisting of a carbocyclic aromatic radical, an alicyclic radical, a branched alkyl, a mixed alkyl-carbocyclic-aromatic radical or an alkyl-alicyclic mixed radical, and R' is a hydrocarbonoyl radical containing 2 to 8 carbon atoms.

References Cited
UNITED STATES PATENTS

| | | | |
|---|---|---|---|
| 2,359,833 | 10/1944 | Faris | 260—78 |
| 2,359,867 | 10/1944 | Martin | 260—78 |
| 2,585,199 | 2/1952 | Watson | 260—78 |
| 2,765,294 | 10/1956 | England | 260—78 |
| 2,834,758 | 5/1958 | Shacklett | 260—78 |
| 2,907,754 | 10/1959 | Howlett et al. | 260—78 |
| 3,065,207 | 11/1962 | Andres | 260—78 |
| 3,296,214 | 1/1967 | Pickett | 260—78 |
| 3,296,215 | 1/1967 | Crovatt | 260—78 |
| 3,304,289 | 2/1967 | Ballentine et al. | 260—78 |
| 3,310,534 | 3/1967 | Brignac et al. | 260—78 |
| 3,057,830 | 10/1962 | Corbin | 260—78 |
| 3,359,227 | 12/1967 | Amann et al. | 260—78 |
| 3,513,135 | 5/1970 | Hermann et al. | 260—78 |

HAROLD D. ANDERSON, Primary Examiner

U.S. Cl. X.R.

8—55; 57—140 R; 260—78 A, 78 L